（12）United States Patent
Xu et al.

(10) Patent No.: US 10,148,148 B2
(45) Date of Patent: *Dec. 4, 2018

(54) VIBRATION MOTOR

(71) Applicant: AAC Technologies Pte. Ltd., Singapore, OT (SG)

(72) Inventors: Hongfu Xu, Shenzhen (CN); Zhilin Chai, Shenzhen (CN); Na Wu, Shenzhen (CN); Fanghua Ling, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 240 days.

This patent is subject to a terminal disclaimer.

(21) Appl. No.: 15/075,672

(22) Filed: Mar. 21, 2016

(65) Prior Publication Data

US 2017/0033665 A1 Feb. 2, 2017

(30) Foreign Application Priority Data

Jul. 30, 2015 (CN) .................... 2015 2 0561595 U

(51) Int. Cl.
H02K 33/16 (2006.01)
H02K 5/04 (2006.01)

(52) U.S. Cl.
CPC ............. H02K 5/04 (2013.01); H02K 33/16 (2013.01)

(58) Field of Classification Search
CPC ........ H02K 33/12; H02K 33/14; H02K 33/16; H02K 35/02

USPC ............... 310/15, 17, 21, 25, 28, 29, 12.16; 381/396, 412, 420, 421

See application file for complete search history.

(56) References Cited

U.S. PATENT DOCUMENTS

| 2011/0018365 A1* | 1/2011 | Kim ................... B06B 1/045 310/17 |
| 2012/0032535 A1* | 2/2012 | Park, II ............... H02K 35/02 310/25 |
| 2013/0229070 A1* | 9/2013 | Akanuma ............ H02K 33/00 310/25 |

FOREIGN PATENT DOCUMENTS

| JP | 2002200460 A | * | 7/2002 | |
| JP | 2010239851 A | * | 10/2010 | |
| JP | WO 2016056507 A1 | * | 4/2016 | ............ B06B 1/04 |
| KR | 20120101800 A | * | 9/2012 | |
| KR | 20130012441 A | * | 2/2013 | |

OTHER PUBLICATIONS

Maruo, Machine Translation of JP2002200460, Jul. 2002.*
(Continued)

Primary Examiner — Quyen P Leung
Assistant Examiner — Eric Johnson
(74) Attorney, Agent, or Firm — Na Xu; IPro, PLLC

(57) ABSTRACT

A vibration motor is disclosed. The vibration motor includes a housing, a substrate engaging with the housing, a vibration unit received in the housing, an elastic member suspending the vibration unit, and a coil assembly interacting with the vibration unit. The vibration unit further includes a pair of slots for respectively receiving a fixing part of the elastic member, and each of the slot includes a volume recessed toward a direction far away from the fixing part. The two slots extend along two opposed directions.

6 Claims, 5 Drawing Sheets

(56) References Cited

OTHER PUBLICATIONS

Shishida, Machine Translation of JP2010239851, Oct. 2010.*
Park, Machine Translation of KR20130012441, Feb. 2013.*
Nakazato, Machine Translation of WO2016056507.*
Yang et al, Machine Translation of KR20120101800, Sep. 2012.*

* cited by examiner

VIBRATION MOTOR

FIELD OF THE DISCLOSURE

The present disclosure generally relates to vibration motors, and more particularly to a vibration motor used in a portable consumer electronic device.

BACKGROUND

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

A related vibration motor generally includes a magnet assembly and a stator assembly. The stator assembly includes a coil support opposed to the magnet assembly for carrying a coil. The coil support surrounds the magnet assembly. However, noises will be produced by the collision between the magnet assembly and the coil support during vibration, which badly affects the performance of the vibration motor.

Therefore, it is desired to provide a new vibration motor which can overcome the aforesaid problem.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

FIG. 3b is a top view of the first weight in FIG. 3a.

FIG. 4b is a front view of the second weight in FIG. 4a.

DETAILED DESCRIPTION

The present disclosure will be described in detail below with reference to the attached drawings and an exemplary embodiment thereof.

Figure 1:
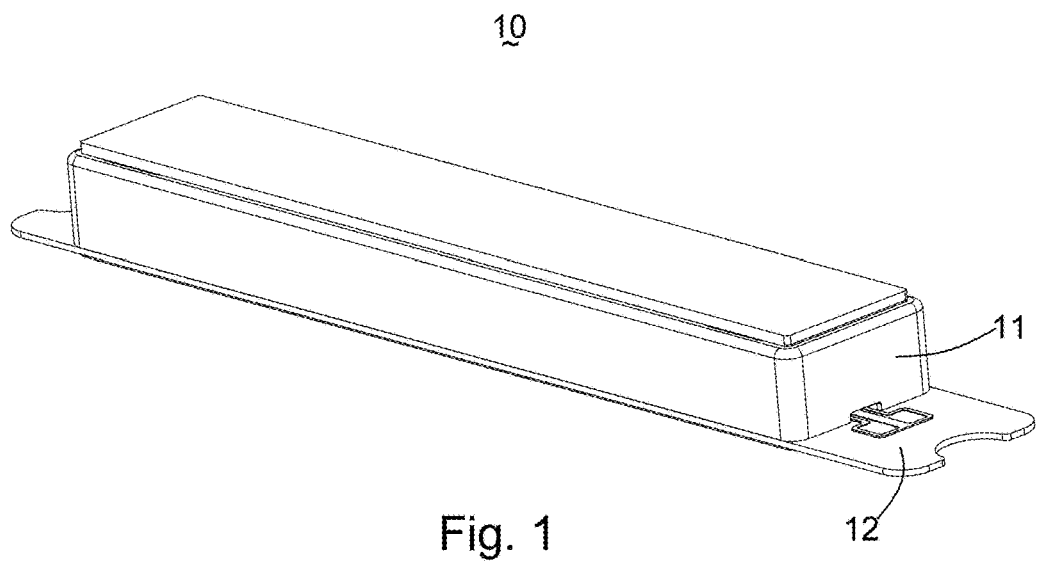
FIG. 1 is an isometric view of a vibration motor in accordance with an exemplary embodiment of the present disclosure.
Figure 2:
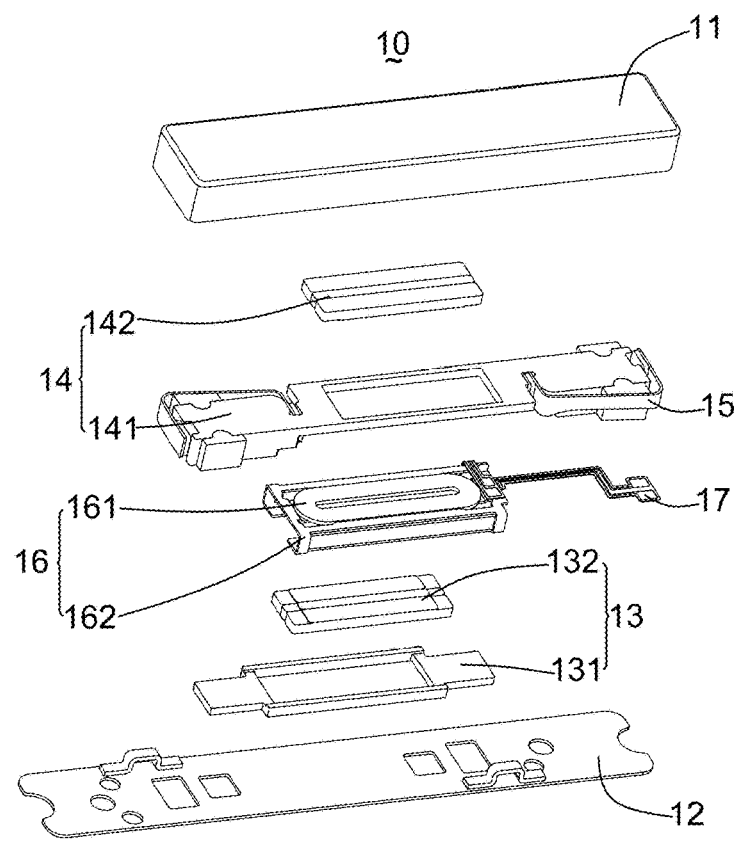
FIG. 2 is an isometric and exploded view of the vibration motor of the exemplary embodiment.

Referring to FIGS. 1-2, a vibration motor 10 in accordance with an exemplary embodiment of the present disclosure includes a housing 11 and a substrate 12 forming an enclosure of the motor. The housing 11 provides protection to other components of the motor, and the substrate 12 provides a mounting surface mountable to an external device. Both of the housing 11 and the substrate 12 are elongated and have a longitudinal axis and a transverse axis.

Further, the vibration motor 10 includes a first magnet assembly 13, a second magnet assembly 14, a plurality of elastic members 15, a coil assembly 16, and a flexible printed circuit (FPC) 17. The first magnet assembly 13 and the second magnet assembly 14 form cooperatively a vibration unit suspended by the elastic members 15 in the housing 11. In fact, the first magnet assembly 13 and the second magnet assembly 14 are assembled together as a whole for generating vibration by virtue of the elastic support provided by the elastic members 15. The first magnet assembly 13 includes a first weight 131 and a first magnet 132 carried by the first weight 131. The second magnet assembly 14 includes a second weight 141 and a second magnet 142 carried by the second weight 141. The coil assembly 16 is used for interacting with the first and second magnet assemblies 13, 14 for producing Ampere Force to drive the vibration unit to vibrate. The coil assembly 16 includes a coil 161 and a coil support 162 for carrying the coil 161. The FPC 17 is electrically connected with the coil 161 of the coil assembly 16 for providing electrical signals to the coil 161.

Figure 3A:
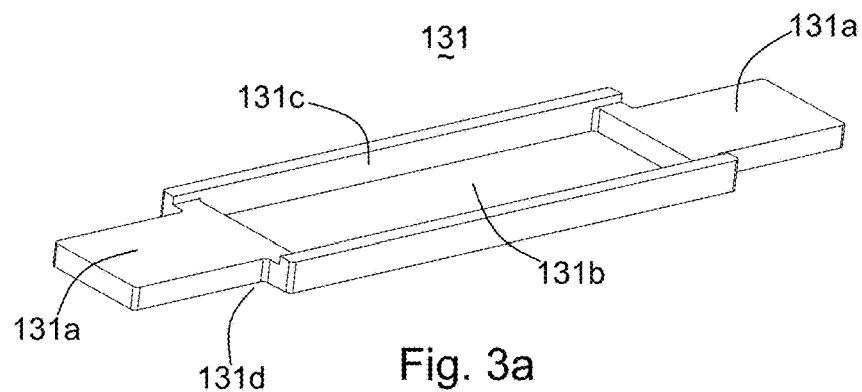
FIG. 3a is an isometric view of a first weight of the vibration motor.
Figure 3B:
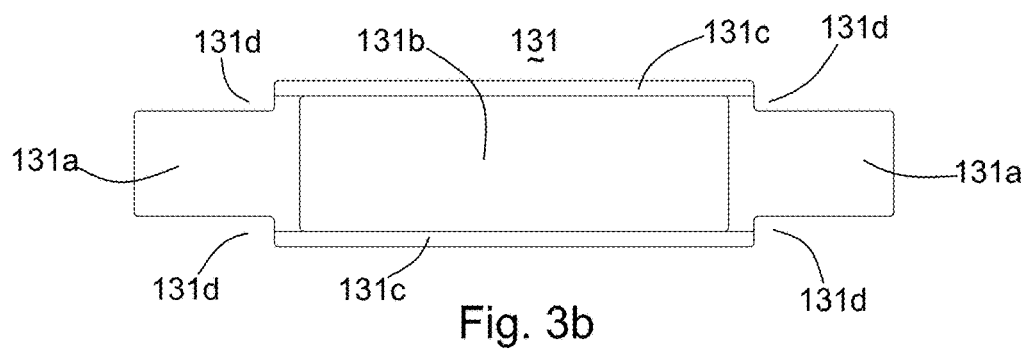

Referring to FIGS. 3a-3b, together with FIG. 2, the first weight 131 of the first magnet assembly 13 is elongated, corresponding to the shapes of the housing and the substrate. The first weight 131 includes a pair of engagement parts 131a and a pair of sidewalls 131c. The engagement parts 131a respectively connect two ends of the sidewalls 131c for forming a first through hole 131b. A width of the engagement part 131a along the transverse axis is smaller than a distance between the two sidewalls 131c along the same direction, thus a plurality of avoidances 131d is accordingly formed.

Figure 4A:
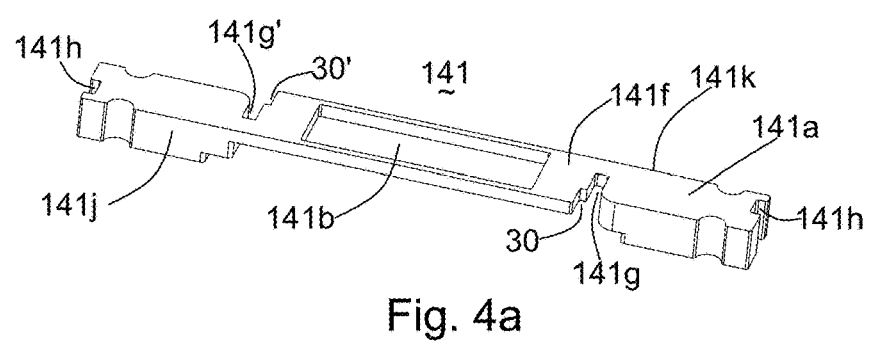
FIG. 4a is an isometric view of a second weight of the vibration motor.
Figure 4B:
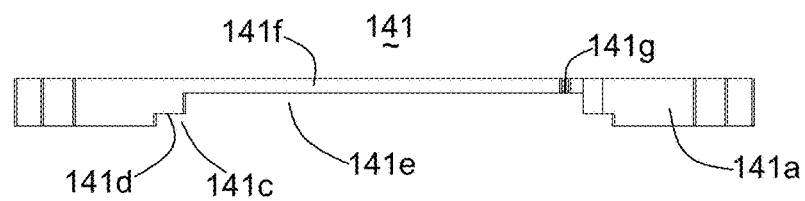

Referring to FIGS. 4a-4b, together with FIG. 2, the second weight 141 is also elongated. The second weight 141 includes a body 141a and a second through hole 141b. The body 141a forms a first recess 141d recessed from a lower surface thereof to a first bottom 141d, and a second recess 141e recessed from the first bottom 141d to a second bottom 141f. The second through hole 141b is form in the second bottom 141f. For describing the structure of the second weight 141 clearly, a surface extending along the elongated direction is defined as a first surface 141J, and a surface extending parallel and opposed to the first surface 141J is defined as a second surface 141K. The second weight 141 further includes a first slot 141g recessed from the first surface 141J toward the second surface 141K, and a second slot 141g' recessed from the second surface 141K and toward the first surface 141J. Each of the first and second slots engages with the elastic member 15. And, the first slot 141g includes a first volume 30. The second slot 141g' includes a second volume 30'. As an improvement, the second weight 141 further includes a pair of pits 141h each provided at an edge of the second weight 141.

Figure 5:
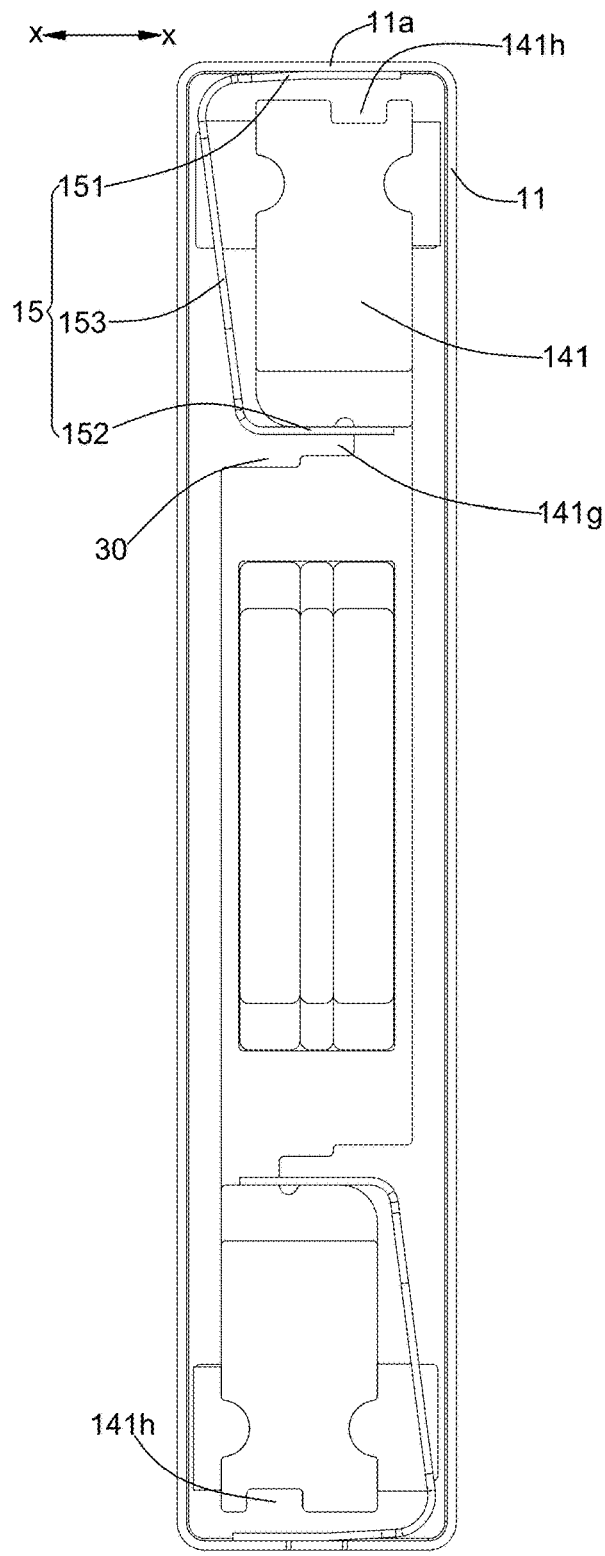
FIG. 5 is a top view of an assembly of the second weight, a housing, and elastic members of the vibration motor.

Referring to FIG. 5, the housing 11 forms a plurality of sides 11a for forming a receiving space for accommodating necessary components therein. The second weight 141 is suspended in the receiving space by the elastic members 15. As shown in FIG. 5, taking the engagement between the elastic member 15 and the first slot 141g as an example, the elastic member 15 includes a first fixing part 151 fixed on one of the sides 11a of the housing 11, a second fixing part 152 received in the first slot 141g and fixed to the second weight 141, and an elastic arm 153 connecting the first fixing part 151 to the second fixing part 152. By virtue of the elastic members 15, the second weight 141 is capable of vibrating in the housing along a deforming direction of the elastic arm 153. In this embodiment, the second weight 141 is capable of vibrating along the transverse axis X-X. In addition, the first volume 30 is recessed toward a direction far away from the second fixing part 152 of the elastic member 15 for forming an extra space for a tool to fix the second fixing part to the second weight 141.

Figure 6:
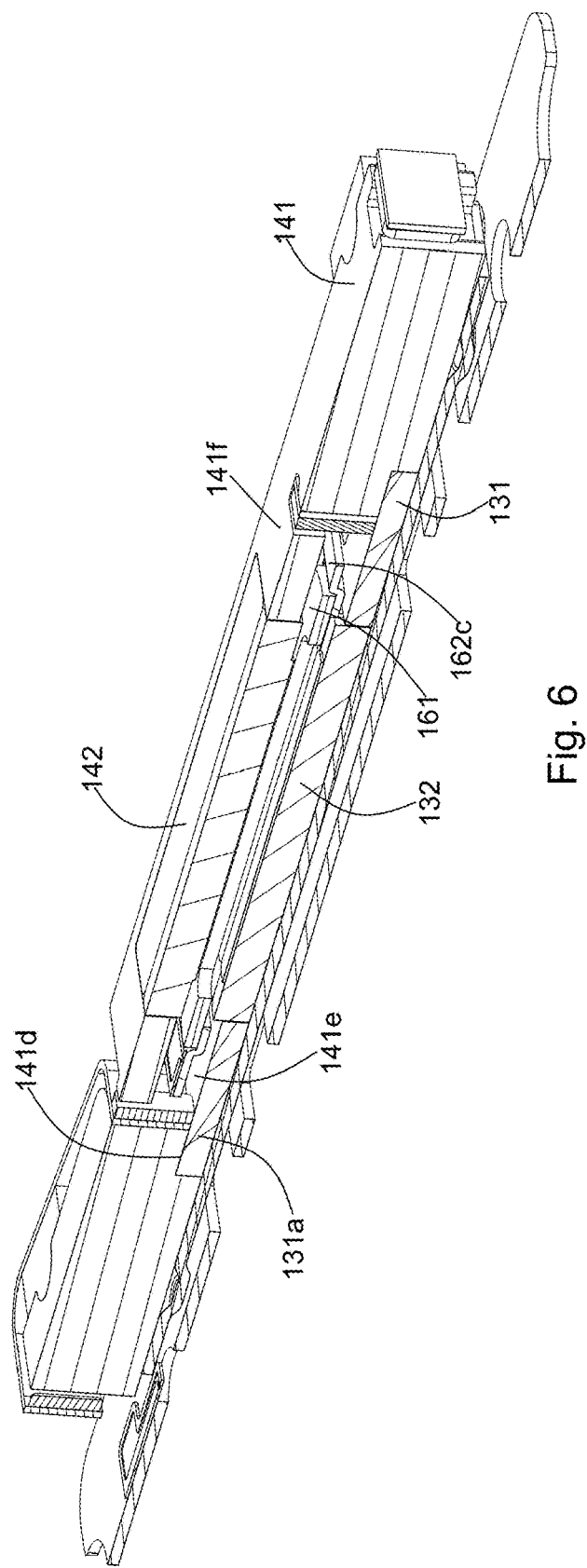
FIG. 6 is a cross-sectional view of the vibration motor taken along a longitudinal axis thereof, wherein the housing thereof has been removed.

Referring to FIG. 6, together with FIGS. 3a, 3b, 4a, and 4b, while assembled, the engagement parts 131a of the first weight 131 fixed on the first bottom 141d of the second weight 141, the first magnet 132 is received in the first through hole 131b, and the second magnet 142 is received in the second through hole 141b, which cooperatively forms the vibration unit.

Figure 7:
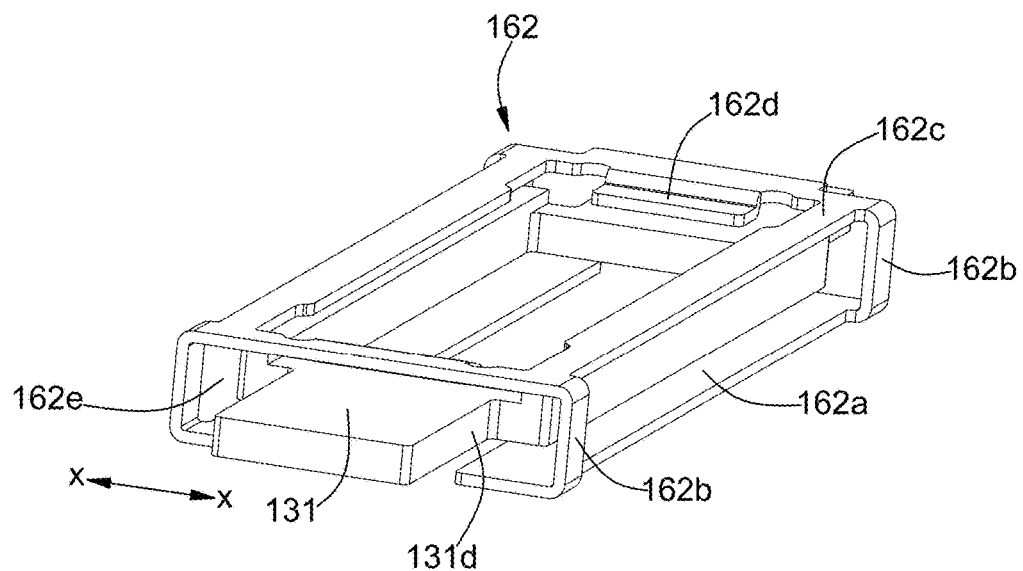
FIG. 7 is an isometric view of an assembly of the weight and a coil support of the vibration motor.
Figure 8:
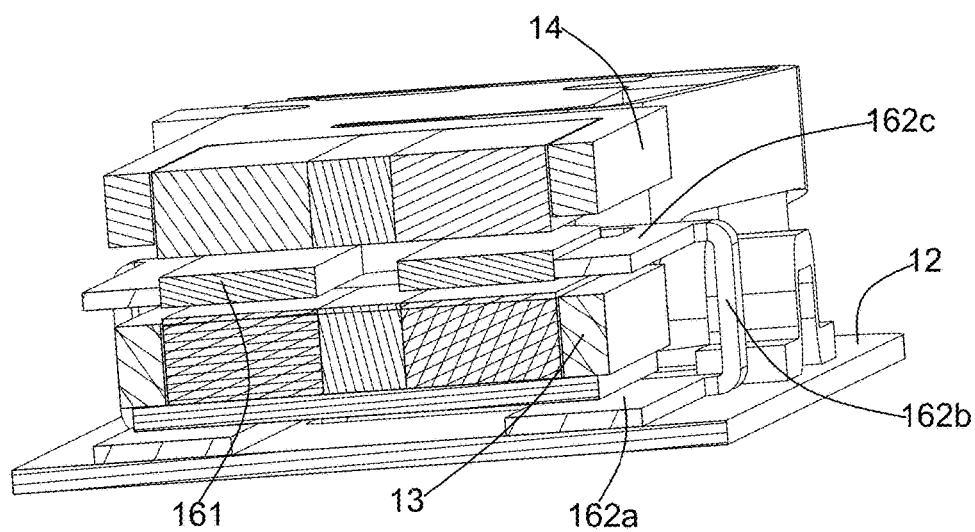
FIG. 8 is a cross-sectional view of the vibration motor taken along a transverse axis thereof, wherein the housing thereof has been removed.

Referring to FIGS. 7-8, the coil support 162 includes a lower part 162a mounted on the substrate 12, a middle part 162b extending vertically from the lower part 162 and an upper part 162c extending from the middle part 162b. The upper part 162c is substantially parallel to the lower part 162a. The upper part 162c further includes a carrying part 162d for carrying the coil 161 thereon. The upper part 162c is spaced apart from the lower part 162a by the middle part 162b for forming an accommodation space 162e. While assembled, the first weight 131 is accommodated in the accommodation space 162e with the engagement parts 131 out of the accommodation space 162e. Referring FIG. 8, together with FIG. 6, since the first weight 131 is accommodated in the accommodation space 162e, the first magnet assembly 13 is also received in the accommodation space 162e with the engagement parts 131 engaged with the first bottom 141d of the second weight 141. Thus, when the vibration unit, i.e., the combination of the first magnet assembly and the second magnet assembly vibrates, the vibration unit could vibrate along the transverse direction X-X with the first magnet assembly 13 moving in the accommodation space 162e. Referring back to FIG. 6, while assembled, the upper part 162c and the coil 161 is located in the second recess 141e, and the coil 161 will interact with the first magnet 132 and the second magnet 142 for producing Ampere Force to drive the vibration unit to vibrate. Another word, the coil 161 is located between the first magnet 132 and the second magnet 142.

Referring back to FIG. 7, the avoidance 131d of the first weight 131 is arranged corresponding to the middle part 162b of the coil support 162. While the vibration unit vibrates along the transverse direction X-X, the avoidance 131d provides an extra space for preventing the first weight 131 interfering with the middle part 162b.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
   a substrate;
   a housing engaged with the substrate for forming an enclosure;
   a first magnet assembly including a first weight and a first magnet assembled with the first weight;
   a second magnet assembly fixed with the first magnet assembly, the second magnet assembly including a second weight engaging with the first weight of the first magnet assembly and a second magnet assembled with the second weight;
   a pair of elastic members, each elastic member including a first fixing part connecting to the housing, and a second fixing part connecting to the second weight for suspending the second magnet assembly with the first magnet assembly in the housing;
   a coil assembly including a coil located between the first magnet assembly and the second magnet assembly, and a coil support carrying the coil, the coil support including a lower part mounted on the substrate, an upper part for carrying the coil, and a middle part spacing the upper part from the lower part, wherein
   the second weight further including a first surface extending along a direction perpendicular to a vibration direction, a second surface parallel and opposed to the first surface, a first slot recessed from the first surface and toward the second surface, a second slot recessed from the second surface and toward the first surface, the first slot engaging with the second fixing part of one elastic member, and the second slots engaging with the second fixing part of another elastic member;
   the first slot includes a first volume recessed toward a direction far away from the second fixing part in the first slot, and the second slot includes a second volume recessed toward a direction far away from the second fixing part in the second slot;
   the first weight including a pair of sidewalls, and a pair of opposed engagement parts connecting with the sidewalls for forming a first through hole, the first magnet received in the first through hole.

2. The vibration motor as described in claim 1, wherein a width of the engagement part along a vibration direction of the motor is smaller than a distance between the two sidewalls, and an avoidance is accordingly formed by the engagement part and the sidewall for preventing the first weight interfering with the coil assembly when the first weight vibrates.

3. The vibration motor as described in claim 1, wherein the second weight includes a body, a first recess recessed from a lower surface of the body to a first bottom, a second recess recessed from the first bottom to a second bottom, and a second through hole formed in the second bottom for receiving the second magnet, the engagement part engages with the first bottom for fixing the first weight with the second weight.

4. The vibration motor as described in claim 1, wherein the lower part, the middle part and the upper part of the coil support form cooperatively an accommodation space for receiving the first weight.

5. The vibration motor as described in claim 4, wherein the upper part of the coil support and the coil is located in the second recess.

6. The vibration motor as described in claim 1, wherein the upper part of the coil support further includes a carrying part for carrying the coil.

* * * * *